United States Patent [19]

Dambre

[11] Patent Number: 4,957,066
[45] Date of Patent: Sep. 18, 1990

[54] FAN ASSEMBLY FOR AN EGG INCUBATOR ENCLOSURE OR A HATCHING ENCLOSURE

[75] Inventor: Pierre Dambre, Chalonnes-sur-Loire, France

[73] Assignee: Elevage Avicole de la Bohardiere, Chalonnes-sur-Loire, France

[21] Appl. No.: 262,429

[22] Filed: Oct. 25, 1988

[30] Foreign Application Priority Data

Oct. 27, 1987 [FR] France ............... 87 14846

[51] Int. Cl.$^5$ .......................................... A01K 41/02
[52] U.S. Cl. ........................................ 119/39; 119/37; 416/235
[58] Field of Search ................. 119/21, 30, 35, 37, 119/38, 39; 98/29, 30, 31.5, 31.6; 416/124, 223 B, 223 R, 235, 236, DIG. 2, DIG. 5; D23/317, 324-326, 370-374, 383-385, 412-414, 499

[56] References Cited

U.S. PATENT DOCUMENTS

| | | | |
|---|---|---|---|
| D. 189,300 | 11/1960 | McLean | D23/413 |
| 435,602 | 9/1890 | Doane | 416/236 X |
| 1,698,763 | 1/1929 | McCauley | 98/29 |
| 2,439,145 | 4/1948 | Porter | 119/35 |
| 3,923,006 | 12/1975 | Dugan et al. | 119/37 |
| 4,546,729 | 10/1985 | Wormgoor | 119/37 |

FOREIGN PATENT DOCUMENTS

| | | | |
|---|---|---|---|
| 0946671 | 8/1956 | Fed. Rep. of Germany | 119/35 |
| 0404671 | 1/1934 | United Kingdom | 119/35 |

Primary Examiner—Robert P. Swiatek
Assistant Examiner—T. Manahan
Attorney, Agent, or Firm—Mason, Kolehmainen, Rathburn & Wyss

[57] ABSTRACT

A fan assembly (10) for an egg incubator enclosure (1) or for a hatching enclosure, in which a centrifugal fan establishes a pressure reduction and thereby sets up a flow of air through egg storage boxes disposed in the vicinity of the fan, wherein the centrifugal fan comprises two turbines (20) mounted on a horizontal axis and disposed substantially in the middle of the enclosure, with the boxes (2) placed on either side of the turbines, and with each turbine being constituted by a ring (21) which is hollow in the center and provided with blades (22) around its periphery. Advantageously, fresh air and recycled air are air-conditioned by being humidified (42), and heated (30) or cooled (41, 51) as required, in the central zone (11) lying between the two spaced-apart central rings of the two turbines, prior to coming into contact with the eggs to be incubated.

10 Claims, 2 Drawing Sheets

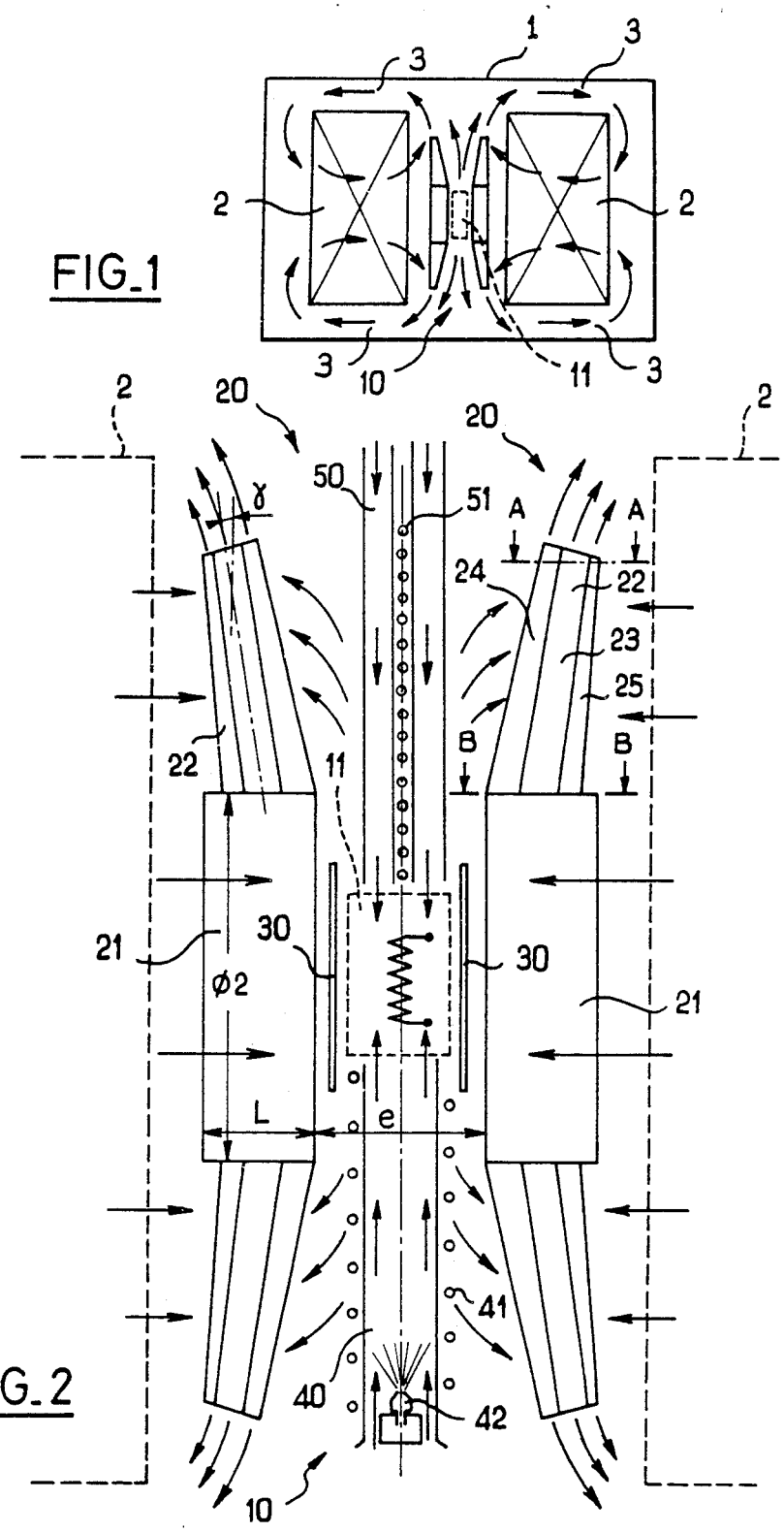

FAN ASSEMBLY FOR AN EGG INCUBATOR ENCLOSURE OR A HATCHING ENCLOSURE

The present invention relates to a fan assembly for an egg incubator enclosure or a hatching enclosure.

More precisely, it relates to such a fan assembly in which a centrifugal fan establishes a pressure reduction, thereby setting up a flow of air through egg storage boxes disposed in the vicinity of the fan.

BACKGROUND OF THE INVENTION

Numerous types of fan assembly have been proposed, as have numerous configurations for the fan assembly and the egg storage boxes, either using a single fan and optimizing the flow of air through the incubator, or else using a plurality of fans distributed at various points of the enclosure.

One of the objects of the present invention is to propose a fan assembly of the above-mentioned type which makes it possible to optimize temperature regulation and humidity regulation in the enclosure and to establish as great a degree of uniformity as possible therein, with high fan efficiency making it possible, for given power, to increase the pressure reduction and to distribute its effect as well as possible among the egg storage boxes.

SUMMARY OF THE INVENTION

To this end, according to the invention, the centrifugal fan comprises two turbines mounted on a horizontal axis and disposed substantially in the middle of the enclosure, with the boxes being placed on either side of the turbines, and with each of the turbines being constituted by a ring which is hollow in the center and which is provided with blades around its periphery.

Thus, by virtue of the configuration of the invention, an intense flow of air is set up in the air conditioning zone lying between the two turbines.

Any of the following features may advantageously be implemented:

fresh air and recycled air are air-conditioned by being humidified, and temperature controlled (i.e. heated or cooled) as necessary, in the central zone lying between the spaced-apart central rings of the two turbines, prior to coming into contact with the mass of eggs to be incubated;

the transverse cross-section of each blade has a central web provided with V-shaped edges; in this case, it is preferable for the shape of the transverse cross-section of each blade to be symmetrical on either side of the central plane of the blade including the axis of the turbine, thereby enabling the turbine to operate in both directions of rotation, with the inside edge V-shape being larger in size than the outside edge V-shape and having an opening angle which is greater than that of the V-shape at the outside edge;

the blades are inclined at an angle relative to the radial direction, with said inclination of the blades relative to the radial direction lying in the range 10° to 20°;

the diameter of the central ring lies between 25% and 60% of the overall diameter of the turbine;

the width in the axial direction of the central ring lies between 25% and 60% of its diameter; and the distance in the axial direction between the two turbines lies between 10% and 30% of the overall diameter thereof.

BRIEF DESCRIPTION OF THE DRAWINGS

An embodiment of the invention is described by way of example with reference to the accompanying drawings, in which:

FIG. 1 is a diagrammatic plan view of an egg incubation enclosure or of a hatching enclosure making use of a fan assembly in accordance with the present invention;

FIG. 2 is an elevation view on a larger scale of said fan assembly;

MORE DETAILED DESCRIPTION

Figure 3:
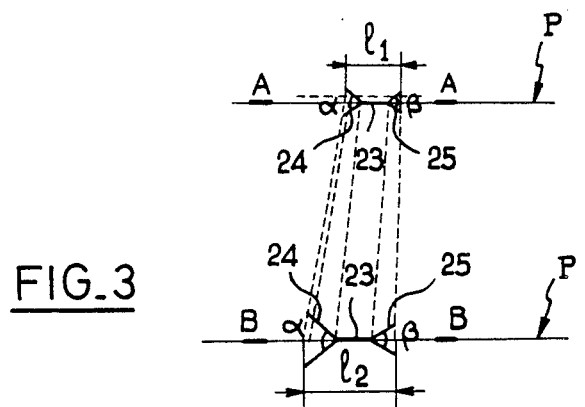
FIG. 3 is a section through a fan blade taken on lines A—A and B—B of FIGS. 2 or 4.
Figure 4:
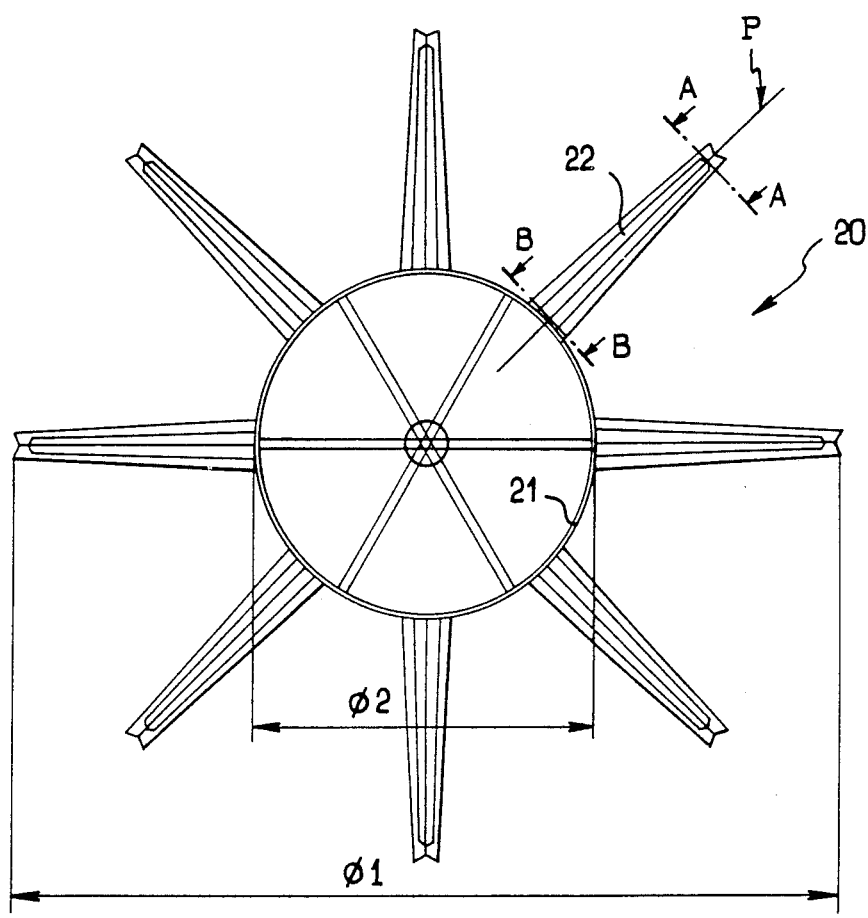
FIG. 4 is a front view of one of the FIG. 2 turbines.

In FIG. 1, reference 1 designates the incubation enclosure or the hatching enclosure, in which a mass of eggs to be incubated is installed in egg boxes which are disposed on either side of the fan assembly 10 which is placed in a central position inside the enclosure.

The fan assembly uses the centrifugal effect to set up a flow of air with axial suction and radial delivery: the air surrounding the egg boxes is thus sucked into the reduced pressure region through all of the boxes and is expelled outwardly towards the wall of the enclosure 1, with the flow of air looping back via an air passage 3 left between the boxes 2 and the wall of the enclosure 1, said passage being wide enough to allow such looped circulation to take place.

In addition to setting up a circulating flow of air, the fan assembly also serves to admit fresh air into the enclosure, to heat or cool the air, and also to humidify it. As described below, these various functions are performed in an air conditioning chamber 11 in the middle of the fan assembly 10, thereby ensuring that the humidity and the temperature are made as uniform as possible since air conditioning takes place at the location where the greatest amount of air mixing takes place prior to the air coming into contact with the mass of eggs being incubated.

FIG. 2 shows the fan assembly 10 in greater detail. It essentially comprises two turbines 20 which face each other and share a horizontal axis of rotation, each of said turbines being constituted by a large diameter central ring 21 carrying a plurality of blades or vanes 22 around its periphery for the purpose of establishing the centrifugal effect of the turbine in conventional manner.

All of the blades are identical and each of them has a profile in right cross-section which remains geometrically similar along its entire length, said profile being constituted, as can be seen in greater detail in FIG. 3, by a central web 23 disposed between V-shaped edges 24 and 25.

This structure serves to establish the desired centrifugal effect with air being sucked in via the two V-shapes 24 and 25 5 of each blade and then outwardly by the flat web 23.

The profile of the transverse cross-section of the blades, as shown in FIG. 3, is symmetrical about the plane P which is the central plane of the blade including the axis of the turbine (i.e. the plane of the sheet in FIG. 2), with the web 23 being situated in the plane P. This symmetry means that the turbines may be rotated in either direction to obtain the same centrifugal effect; in order to compensate for small local differences in temperature which could exist, in particular because eggs of different qualities are being incubated in the apparatus, it is desirable to reverse the direction of turbine rotation several times a day.

The inside V-shape 24 of the turbine has an opening angle α which is greater than the opening angle β of the outside V-shape 25. This asymmetry accentuates the pressure reduction effect existing between the two turbines.

Further, the blades are slightly inclined at an angle γ relative to the vertical, so as to avoid the projected air striking the walls of the enclosure 1 (FIG. 1) perpendicularly, and instead it is delivered outwardly in the circulation direction of the air flow.

As a result, the mass of eggs to be incubated brought together in the center of the incubator is initially enveloped by the centrifugal effect. The air is then sucked back towards the fan assembly through the eggs being incubated by virtue of the reduced pressure established both directly due to the shape of the blades and also by the pumping that occurs at the central ring in order to compensate for the pressure reduction created by the centrifugal effect between the two turbines.

In addition to its function of circulating the air flow, the fan assembly of the present invention serves to provide air conditioning for the enclosure, with the various parameters of this air conditioning being controlled, in accordance with the invention, from a central air conditioning chamber 11 situated in the gap between the two rings 21 and facing the two turbines.

To this end, annular resistances 30 are provided for heating the air, should that be necessary, and they serve to increase the temperature of the air which is sucked into the rings.

A portion of the recycled air is admitted into the bottom portion of a vertical duct 40 whose top end opens out into the air conditioning chamber 11. The air conditioning chamber is provided with cooling means 41, e.g. a coil of tubing having a cooling fluid flowing therein, with humidification being provided, for example, by ultrasonic spraying via a nozzle 42 placed inside the duct 40 close to the location where air is recovered from the bottom of the incubator.

Air is renewed by means of a duct 50 conveying air taken from the outside into the air conditioning chamber 11 in the middle of the fan assembly, with said air being optionally cooled by cooling means 51 which are of the same type as the means 41.

In one particular embodiment of the present invention, the various components have the following dimensions:

outside diameter φ1 of the turbine: 1.6 meters (m) to 2 m;
diameter φ2 of the central hollow ring: 0.6 m to 0.9 m;
width L of said ring: 0.23 m to 0.30 m;
gap e between the two turbines 0.3 m to 0.5 m;
inclination γ of a blade relative to the vertical: 12° to 18°;
opening angle α of the inside V-shape: 30° to 50°;
opening angle β of the outside V-shape: 25° to 35°;
width l2 of the blades at their base: 0.18 m to 0.22 m; and width l1 of the blades at their radially outer ends: 0.10 m to 0.15 m.

We claim:

1. A fan assembly for an egg incubator enclosure or for a hatching enclosure, in which a centrifugal fan establishes a pressure reduction and thereby sets up a flow of air through egg storage boxes disposed in near the fan, wherein the centrifugal fan comprises two turbines mounted on a horizontal axis and placed face to face on either side of a vertical central plane disposed substantially in the middle of the enclosure, with the boxes placed on either side of the fan and with each turbine being constituted by a ring which is hollow in the center and provided with blades around its periphery;

and wherein each said blade has a transverse cross-section comprising a central web having an inside edge at its end oriented towards said central plane and an outside edge at its opposite end, each of said edges having a V-shape, with its apex adjacent said central web and opening outwardly therefrom for producing within the hollow ring a region of reduced pressure, thereby sucking in an axially oriented direction the air from the boxes, and for expelling the air so sucked along said blades, in a radially outwardly oriented direction.

2. A fan assembly according to claim 1, in which fresh air and recycled air are air-conditioned by being humidified and temperature controlled as necessary, in a central zone lying between said rings of the two turbines arranged in a spaced-apart relationship, prior to coming into contact with said egg storage boxes.

3. A fan assembly according to claim 1, in which the shape of the transverse cross-section of each blade is symmetrical on either side of a central plane of the blade including the axis of the turbine, thereby enabling the turbine to operate in both directions of rotation.

4. A fan assembly according to claim 1, in which the inside edge V-shape is larger in size than the outside edge V-shape.

5. A fan assembly according to claim 1, in which said V-shape edges have respective opening angles such that the opening angle of the inside edge V-shape is greater than the opening angle of the outside edge V-shape.

6. A fan assembly according to claim 1, in which the blades are inclined at an angle relative to said vertical center plane.

7. A fan assembly according to claim 6, in which the angle of inclination of the blades relative to said vertical central plane lies in the range 10° to 20°.

8. A fan assembly according to claim 1, in which the diameter of the central ring lies between 25% and 60% of the outside diameter of the turbine.

9. A fan assembly according to claim 1, in which the width in the axial direction of the central ring lies between 25% and 60% of the diameter thereof.

10. A fan assembly according to claim 1, in which the distance in the axial direction between the two turbines lies between 10% and 30% of the outside diameter thereof.

* * * * *